United States Patent
Hogh

(10) Patent No.: US 12,054,236 B2
(45) Date of Patent: Aug. 6, 2024

(54) INFLATABLE SUSPENDED CEILING FOR A VEHICLE COMPARTMENT, IN PARTICULAR FOR A PASSENGER CABIN OF AN AIRCRAFT

(71) Applicant: Airbus Operations GmbH, Hamburg (DE)

(72) Inventor: Robert Hogh, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/848,902

(22) Filed: Jun. 24, 2022

(65) Prior Publication Data
US 2022/0411063 A1    Dec. 29, 2022

(30) Foreign Application Priority Data
Jun. 25, 2021 (EP) .................................... 21181840

(51) Int. Cl.
*B64C 1/06*     (2006.01)
*B64D 11/00*     (2006.01)

(52) U.S. Cl.
CPC .............. *B64C 1/066* (2013.01); *B64D 11/00* (2013.01); *B64D 2011/0046* (2013.01)

(58) Field of Classification Search
CPC . B64D 11/00; B64D 2011/0046; B64C 1/066; E04H 15/006; E04H 15/20; E04H 15/06; E04H 2015/201; E04H 2015/206
See application file for complete search history.

(56) References Cited

U.S. PATENT DOCUMENTS

| | | | | |
|---|---|---|---|---|
| 3,375,321 A | * | 3/1968 | Laing ................ | H05K 9/0001 174/385 |
| 3,423,121 A | | 1/1969 | Lipkin et al. | |
| 3,784,994 A | * | 1/1974 | Kery ................ | A47C 27/063 5/710 |
| 3,918,758 A | * | 11/1975 | Fournier ............. | B66C 1/36 24/599.7 |

(Continued)

FOREIGN PATENT DOCUMENTS

| | | |
|---|---|---|
| AU | 2006 100 241 A4 | 5/2006 |
| EP | 2 477 891 A2 | 7/2012 |

(Continued)

OTHER PUBLICATIONS

European Search Report for Application No. 21181840 dated Dec. 3, 2021.

*Primary Examiner* — Tien Q Dinh
*Assistant Examiner* — Nevena Aleksic
(74) *Attorney, Agent, or Firm* — KDW Firm PLLC

(57) ABSTRACT

An inflatable suspended ceiling for a vehicle compartment, in particular for a passenger cabin of an aircraft, includes a flat fabric cover sheet configured to roof over at least a longitudinal section of an interior space along an extending direction of the vehicle compartment underneath a structural ceiling of the vehicle compartment, and a tensioning structure attached to the cover sheet to carry the cover sheet from above and having a flexible envelope enclosing at least one inflatable chamber configured to tension the cover sheet when inflated. Mounting members are attached to the tensioning structure to mount the tensioning structure to counter-mounting members on the structural ceiling in a hanged configuration.

14 Claims, 2 Drawing Sheets

(56) References Cited

U.S. PATENT DOCUMENTS

| | | | |
|---|---|---|---|
| 4,352,259 A * | 10/1982 | Smith | A01G 9/225 |
| | | | 47/17 |
| 8,745,928 B2 | 6/2014 | Greiner | |
| 8,814,093 B2 | 8/2014 | Wuggetzer et al. | |
| 9,650,804 B1 * | 5/2017 | Rosales | E04H 15/006 |
| 10,377,492 B1 * | 8/2019 | Lee | B64C 1/066 |
| 2008/0078874 A1 * | 4/2008 | Schalla | B64D 11/00 |
| | | | 244/118.5 |
| 2009/0308975 A1 * | 12/2009 | Macgregor | B64C 1/066 |
| | | | 244/119 |
| 2015/0232199 A1 * | 8/2015 | Kircher | B60Q 3/54 |
| | | | 362/470 |

FOREIGN PATENT DOCUMENTS

| | | |
|---|---|---|
| EP | 3 272 643 A1 | 1/2018 |
| WO | WO 2011/032996 A2 | 3/2011 |

* cited by examiner

INFLATABLE SUSPENDED CEILING FOR A VEHICLE COMPARTMENT, IN PARTICULAR FOR A PASSENGER CABIN OF AN AIRCRAFT

CROSS-REFERENCE TO RELATED APPLICATION

This application claims priority to EP Patent Application No. 21181840.6 filed Jun. 25, 2021, the entire disclosure of which is incorporated by reference herein.

TECHNICAL FIELD

The disclosure herein pertains to an inflatable suspended ceiling for a vehicle compartment, in particular for a passenger cabin of an aircraft.

BACKGROUND

In aircraft design and construction, efforts are continually being made to enhance and improve production efficiency and costs, installation effort and time, sustainability and to reduce overall weight while maintaining or improving component performance. There have been sporadic attempts in the aviation industry in recent years to make use of inflatable structures as weight saving solutions for the interior and exterior of aircraft. Inflatable components are already widely used in other technological fields, for example, in the leisure industry and the camping sector where they comprise among others inflatable tents, stand-up boards, cushion devices and so on. However, additional challenges have to be faced in order to be able to use such structures in the aviation field. Among others, one has to cope with relatively large pressure differences. Preferred materials are sustainable and durable within flammability requirements. Moreover, it would be desired to achieve stable outer dimensions of the inflatable devices under blown-up conditions.

As an example for such an inflatable device, EP 3 272 643 A1 describes an inflatable partition for an aircraft, which may be installed in a passenger compartment to divide the compartment into different sections or regions.

EP 2 477 891 A2 on the other hand describes a covering device for an interior of an aircraft comprising a flat fabric web, a guide unit and at least one tensioning element. The guide unit is set up for being attached in the interior along an extension direction of the interior and for displaceably guiding the material web along the extension direction. The tensioning element is further provided to be attached in the interior and to tension the flat fabric web by applying a tensile force to the front edge and/or the rear edge of the material web along the extension direction of the interior. This allows a ceiling of an aircraft cabin, for example, to be covered quickly and reliably by a single-piece covering element in the form of a flat fabric web.

SUMMARY

Against this background, it is an object of the disclosure herein to provide a new and improved ceiling for a compartment of an aircraft.

This object is achieved by an inflatable suspended ceiling and an aircraft having features disclosed herein.

According to one aspect of the disclosure herein, an inflatable suspended ceiling for a vehicle compartment, in particular for a passenger cabin of an aircraft, comprises a flat fabric cover sheet configured to roof over at least a longitudinal section of an interior space along an extending direction of the vehicle compartment underneath a structural ceiling of the vehicle compartment; a tensioning structure attached to the cover sheet to carry the cover sheet from above and having a flexible envelope enclosing at least one inflatable chamber configured to tension the cover sheet when inflated; and mounting members attached to the tensioning structure and configured to mount the tensioning structure to counter-mounting members on the structural ceiling in a hanged configuration.

According to another aspect of the disclosure herein, an aircraft comprises an inflatable suspended ceiling according to the disclosure herein.

Thus, one idea of the disclosure herein is an inflatable ceiling in a vehicle compartment in order to safe weight, production costs and installation time. Such an "air ceiling" provides particular advantages for passenger cabins, e.g. in an aircraft, due to its innovative design and appearance. On top of that, the inflatable ceiling of the disclosure herein also has logistical advantages due to simplified transport and stowage options.

Current ceilings in passenger cabins comprise fixedly and permanently installed linings made of panels from fiber reinforced plastic composites that are usually provided in a sandwich configuration of various layers and produced in a laminating procedure. The manufacture and installation of these panels can be complex, time consuming and expensive as large numbers of such panels need to be attached to the cabin substructure, which requires a multitude of structural interfaces, in particular brackets, causing further increases in weight of the assembly.

The inflatable ceiling of the disclosure herein on the other hand can be produced for the whole cabin length or, as needed, in longer sections, resulting in less brackets for installation, much faster installation, better appearances due to the absence of visible gaps between single ceiling panels and less weight. The ceiling may be rolled-up in the deflated configuration, e.g. for transport and stowage, and can then be simply unfurled for the installation process and be attached to the ceiling via the mounting members. This implies that the entire cabin ceiling can be installed in one shot instead of many individual installation steps. The usually required adjustment efforts to follow the defined gap and seal definitions for a panel assembly can thus be avoided due to the "no gaps" approach of the present air ceiling.

The cover material forms the visible part of the ceiling and is made of fabric, which can be produced with common fabric tools and can be attached with common methods to the elastic material of the inflatable envelope, which highly reduces the logistic effort. The fabric itself can be recycled with common procedures. Honeycomb panels on the other hand with their resin, fiberglass and paper mix are often poor to non-recyclable in contrast to fabrics or plastics that can be utilized for the present ceiling.

The flexible envelope of the tensioning structure surrounds one or several air chambers that can be inflated and/or pressurized to tension and/or stiffen the cover material attached thereto. To this end, the flexible envelope may be made of a relatively pliable sheet of material, e.g. a synthetic film or foil, but may also comprise a woven or non-woven fabric or textile material, optionally coated by a sealing layer. For example, the flexible envelope may comprise a synthetic material like polyester, nylon, polyethylene terephthalate, polyurethane, polyamide, and para-aramid synthetics, such as Kevlar. This provides the advantage that the flexible envelope has the potential to provide the ceiling with a very low-mass or light-weight structure compared to conventional fiber-reinforced honeycomb structures.

Advantageous embodiments and improvements are disclosed herein.

According to an embodiment of the disclosure herein, the tensioning structure may comprise at least two inflatable chambers attached to two laterally opposite sides of the cover sheet and running along the cover sheet in the extending direction.

The two inflatable chambers may be formed as long tubes running along each lateral side of the cover sheet. The two chambers may provide tension along the extending direction of the vehicle compartment, that is, in a lengthwise direction of the inflatable ceiling.

According to an embodiment of the disclosure herein, the inflatable chambers oriented in the extending direction may be gaseously connected with each other by laterally running inflatable chambers.

Also the laterally running inflatable chambers may be formed as tubes and may provide tension in a lateral direction of the inflatable ceiling, that is, perpendicular to the extending direction of the vehicle compartment. The longitudinal and lateral chambers may be gaseously connected via suitable devices, e.g. valves, control valves etc. However, the chambers may also jointly form one single inflatable volume that comprises several sub-volumes oriented in different directions.

According to an embodiment of the disclosure herein, the inflatable suspended ceiling may further comprise suspension cords connecting the mounting members with the tensioning structure and/or the counter-mounting members with the structural ceiling.

Cords in this sense also comprise lines, ropes and/or wires or similar means that can be employed for a dropped or suspended installation. This installation approach provides significant advantages due to tolerances and installation time. The length of the cords or similar means may be chosen such that the inflatable ceiling hangs a few to several centimeters into the vehicle compartment.

The cords may comprise fiber materials commonly used for ropes and the like. For example, the cords may comprise aramid or nylon fibers. However, the cords may also comprise metal and/or wire as used, for example, to hang dropped ceilings below a main (structural) ceiling in buildings.

In addition to the suspended installation via cords, also brackets may be used in addition to further secure the inflatable ceiling to the structural ceiling. However, the number of brackets and/or installations points may be significantly reduced in comparison to common ceiling installations due to the reduced weight of the present inflatable approach.

According to an embodiment of the disclosure herein, the mounting members may be configured as cord nipples and the counter-mounting members as hooks to take hold of the mounting members.

In this vein, the ceiling may be installed at selected mounting points following a simple manual routine by hooking up the mounting members in the counter-mounting members.

According to an embodiment of the disclosure herein, the counter-mounting members may comprise a spring forced release lever configured to engage the corresponding mounting member in a mounted configuration and to disengage the corresponding mounting member by being pushed into a release configuration.

For example, each mounting member may be formed as a cord nipple or similar that is hanged into a hook-like counter-mounting member, which is then engaged by a spring forced lever. The lever then provides a very simple way to secure the mounting members in the mounted position and to release them again from there if required.

According to an embodiment of the disclosure herein, the inflatable suspended ceiling may further comprise a protection cover covering the cover sheet and/or the tensioning structure from above.

The protection cover may, for example, open spaces above the cover sheet between the inflatable chambers of the tensioning structure in order to keep any dirt, insects, condensation fluid and so on from the cover sheet. In addition, such a protection cover may also function as or be accompanied by a reflecting layer or screen that is used to reflect any light coming from the cover sheet and/or lighting elements in the suspended ceiling back to the cover sheet to create ambient and/or indirect lighting within the vehicle compartment.

According to an embodiment of the disclosure herein, the tensioning structure may be adapted to be connected to an air duct system of the vehicle compartment to fill the at least one inflatable chamber with air.

In order to inflate or pressurize the at least one chamber of the tensioning structure, a pressurized air supply system may thus be employed that is typically available on aircraft. Aircraft generally have access to a supply of pressurized air from the compressors of their jet turbines, which are also employed to pressurize the cabin space for flights at altitude and to provide fresh air to the cabin.

According to an embodiment of the disclosure herein, the inflatable suspended ceiling may further comprise a compressor system connected to the at least one inflatable chamber via at least one control valve and configured to regulate pressure within the at least one inflatable chamber, thereby regulating a tension level of the cover sheet.

The compressor system may be provided together with the other components of the suspended ceiling for this particular purpose. However, in other embodiments, also a compressor system may be utilized for this purpose that is already available in the vehicle compartment for other reasons, e.g. to inflate a cabin partition, pressurize passenger seats and so on.

Such a compressor system may also be combined with a connection to an air duct system of the vehicle as follows. The air duct system (e.g. a riser duct system of an aircraft) may provide the main gas/air volume to inflate the chambers of the inflatable ceiling to a certain basic pressure. In this condition, the cover sheet may not yet be fully tensioned but may already be positioned in its final position due to the tension provided by the air duct system. The additional pressure required to fully tension the cover sheet may then be provided by the compressor system. The compressor may particularly be adapted to regulate and/or fine-tune the pressure within the ceiling during operation of the vehicle, e.g. in order to provide optimal conditions for different operating modes of the vehicle (e.g. aircraft on the ground, in flight, change of pressure due to different temperature etc.).

According to an embodiment of the disclosure herein, the inflatable suspended ceiling may further comprise lighting elements configured to illuminate the cover sheet from above.

The lighting elements may be installed anywhere in and/or on the suspended ceiling, e.g. above and/or on top of the cover sheet and/or between the cover sheet and a protective cover etc. For example, they may be attached to the flexible envelope above the cover sheet, e.g. at lateral ends and running along an extension of the suspended ceiling. The lighting element may be accompanied by the required electronics and may be electrically connected to corresponding electric interface of the vehicle compartment in order to provide power to the system. For example, the lighting elements may be based on LED lighting and comprise various LED elements like COB-LEDs and similar in order to produce various different lighting scenarios within the vehicle compartment (e.g. direct lighting, indirect lighting, ambient lighting etc.). To this end, the cover sheet may be configured translucent and/or transparent at least in sections.

According to an embodiment of the disclosure herein, the cover sheet may hence be configured translucent and/or transparent at least in sections.

According to an embodiment of the disclosure herein, the cover sheet may be sewed and/or welded to the tensioning structure.

Hence, production costs could be reduced by sewing and welding instead of relying on a composite panel design requiring various expensive production tools.

According to an embodiment of the disclosure herein, the cover sheet may be made from a single fabric ply.

In the context of the disclosure herein, a flat fabric sheet means any flexible or semi-rigid and essentially two-dimensional structures made of any suitable fabric material, which include, for example, tarpaulins, mats, linen, mesh fabrics, lattice tarpaulins and the like. To eliminate the risk of condensation dripping, which may occur between the fabric sheet and the top of the interior, the sheet could be waterproof or at least capable of distributing condensation in the surface of the sheet so that it can slowly evaporate there.

By using a single fabric ply, the whole compartment or cabin could be provided with a single continuous and uninterrupted ceiling. The ply could be rolled up for stowage and transport and would simply have to be enrolled in order to install the ceiling in one single installation step, thereby decreasing installation efforts significantly.

The disclosure herein will be explained in greater detail with reference to example embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 1:
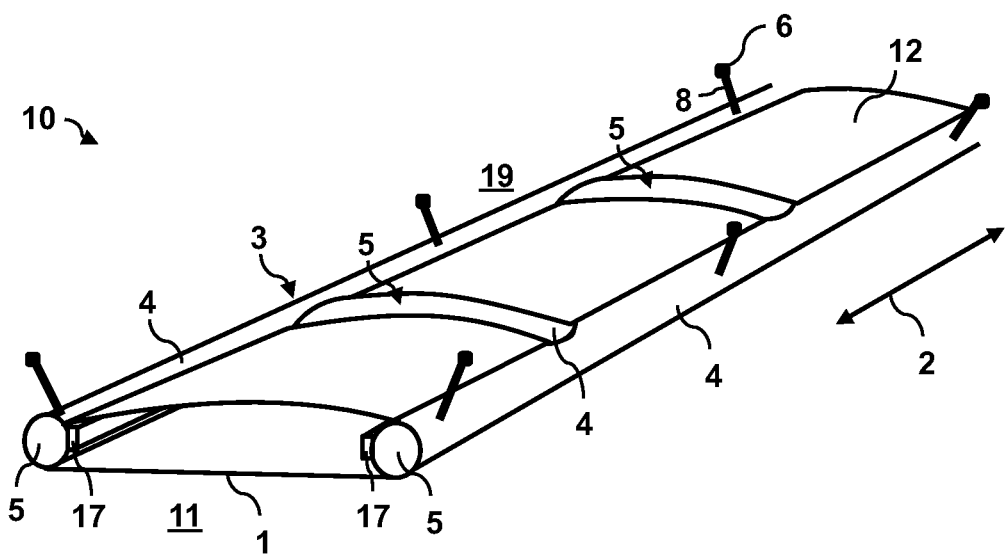
FIG. 1 schematically depicts a perspective view of an inflatable suspended ceiling according to an embodiment of the disclosure herein.
Figure 2:
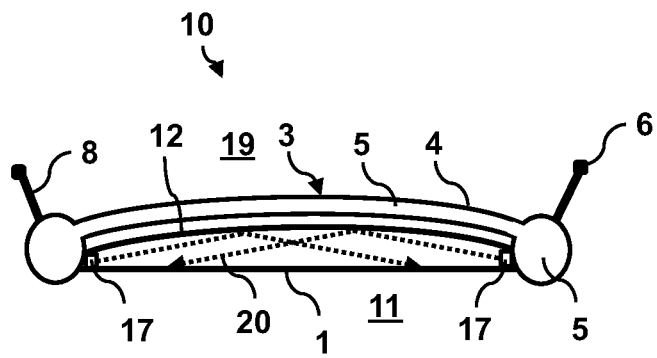
FIG. 2 schematically depicts a cross-sectional view of the inflatable suspended ceiling of FIG. 1.
Figure 4:
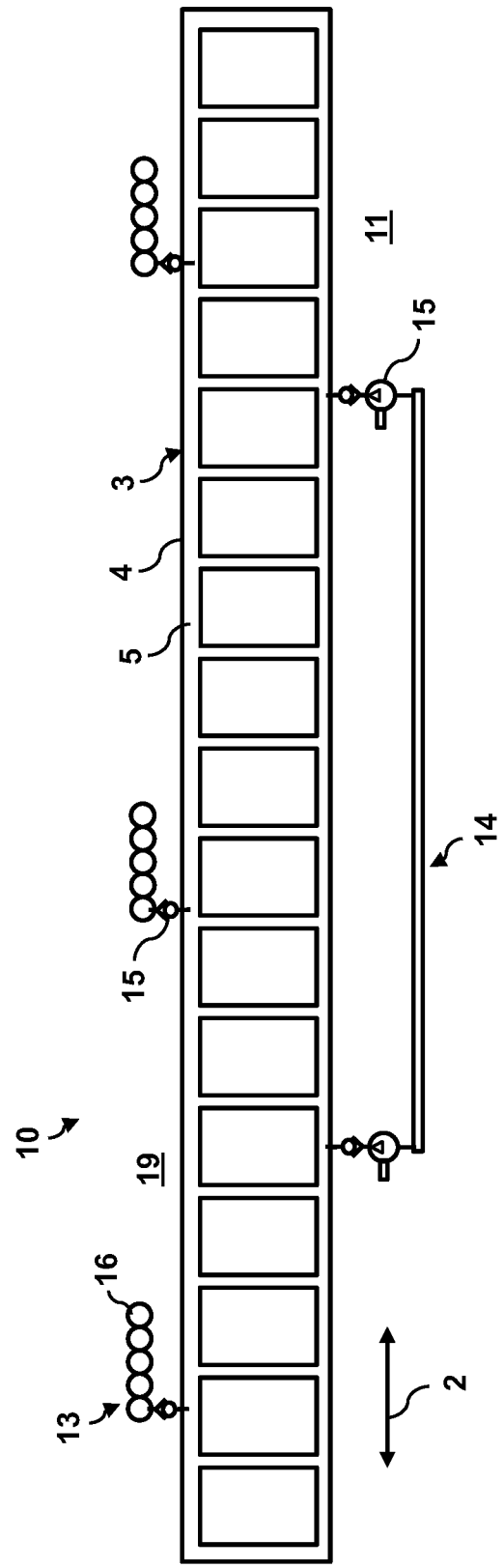
FIG. 4 schematically depicts the inflatable suspended ceiling of FIGS. 1-3 in a side view.

FIG. 1 schematically depicts a perspective view of an inflatable suspended ceiling 10 according to an embodiment of the disclosure herein. The inflatable suspended ceiling 10 is also shown in FIG. 2 in a cross-sectional view and in FIG. 4 in a side view.

Figure 3:
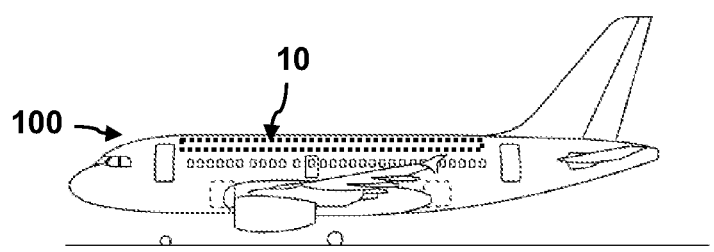
FIG. 3 shows an aircraft having the inflatable suspended ceiling of FIGS. 1 and 2.

The inflatable suspended ceiling 10 is provided for a vehicle compartment, in particular for a passenger cabin of an aircraft 100, e.g. the commercial passenger airplane shown in FIG. 3. The suspended ceiling 10 can replace conventional ceiling linings as they are usually employed in aircraft where a plurality of fiber-composite lining panels are mounted in a relatively cost-, time- and weight-consuming manner. The present system replaces such conventional solutions with a suspended ceiling 10 that is hung below a main structural ceiling of the aircraft 100 in a somewhat similar vein as a dropped ceiling is hung below the main ceiling of a building. The suspended ceiling 10 can thus hide the structural elements of the structural ceiling of the aircraft 100 and the further infrastructure, including piping, wiring, ductwork and so on, by closing off a plenum space 19 between its upper side and the structural ceiling. Contrary to the solutions known from modern construction however, the present ceiling 10 is configured inflatable to save as much weight as possible, as will be described further below.

More specifically, the inflatable suspended ceiling 10 comprises a flat fabric cover sheet 1 configured to cover at least a longitudinal section of the structural ceiling of the aircraft 100 from an interior space 11 along an extending direction 2 of the vehicle compartment. The cover sheet 1 is made from a single fabric ply, which can be provided in such a length that basically the complete longitudinal and lateral extension of the interior space 11 of the vehicle compartment could be roofed over by the single ply.

Preferably, the flat fabric cover sheet 1 is made of an elastic material so that length variability can be achieved and longitudinal movements, transverse distortions or other changes in shape can be compensated. The material could be chosen to combine cladding and lighting functions in one single sheet. In the embodiment of FIGS. 1 and 2, two example lighting elements 17 are arranged above the cover sheet, e.g. elongated LED strips or the like arranged at lateral ends above the cover sheet 1 and running along the extending direction 2. It is to be understood however that such linear or other lighting elements could be integrated directly into the fabric sheet in other embodiments, for example, by weaving them in such that the fabric has self-illuminating properties. The lighting elements 17 could be arranged to face towards and/or away from the interior space 11 to create direct and/or indirect lighting (e.g. they could face laterally inwards as shown in FIG. 2, cf. the example light rays 20). To this end, the fabric sheet 1 could be configured transparent, partially transparent or translucent so that light can pass more or less uniformly through it. With appropriate coloring and material design of the fabric sheet 1, light that is not dazzling and that has a pleasant luminous color could be produced. Using translucent materials would convey to the passenger that the visible space appears larger than it is (when trying to touch the cover sheet 1, one would touch it faster than expected, because the eye has no reference to depth in backlit homogeneous surfaces).

The flat fabric cover sheet 1 thus represents the part of the ceiling 10 that is visible to the passengers of the aircraft. Using a fabric sheet for the described purpose thus not only provide weight benefits but also comes with a simplified assembly/installation process. Many suitable fabric materials are recyclable and thus more environmentally friendly, in particular compared to the materials usually used for cabin linings.

The inflatable suspended ceiling 10 further comprises a tensioning structure 3 attached to cover sheet 1 to carry the cover sheet 1 from above and having a flexible envelope 4 enclosing at least one inflatable chamber 5 configured to tension the cover sheet 1 when inflated. The cover sheet 1 may be formed from any suitable flexible material, in particular from a relatively pliable sheet of synthetic material, e.g. nylon, polyester, polyethylene terephthalate, polyurethane, polyamide and/or para-aramid synthetics, such as Kevlar. The material of the flexible envelope 4 can be sewed and/or welded to the tensioning structure 3 to keep the production and assembly as simple as possible.

In the particular example of FIGS. 1 and 2, the tensioning structure 3 comprises two tubelike inflatable chambers 5 attached to two laterally opposite sides of the cover sheet 1 and running along the cover sheet 1 in the extending direction 2. These two inflatable chambers 5 oriented in the extending direction 2 are gaseously connected with each other by several laterally running inflatable chambers 5, which are also provided in a tubelike configuration. The longitudinally and laterally running chambers 5 together form a single inflatable volume that follows the basic shape of a ladder (the lateral chambers 5 corresponding to the rungs and the longitudinal chambers 5 corresponding to the rails), wherein the longitudinal chambers 5 provide longitudinal tension and the lateral chambers 5 provide lateral tension to the fabric sheet 1.

The remaining open volumes between the cover sheet 1 and the inflatable chambers 5 is covered by a protection cover 12 against dirt and condensation water, which may also be adapted as a reflecting surface to reflect the light from the lighting elements 17 back to the cover sheet 1 (cf. light rays 20 in FIG. 2).

The tensioning structure 3 is adapted to be connected to an air duct system 13 of the vehicle compartment comprising a system of several riser duct interfaces 16 to fill the at least one inflatable chamber 5 with air stemming from riser ducts of the aircraft 100. The air flow into and out of the tensioning structure 3 may be controlled by several control valves 15. In this vein, the air supply already present at common passenger aircraft can be used to pressurize the tensioning structure 3 to a basic level where the fabric sheet 1 is already stretched out to such an extension that it continuously contacts or abuts the structural ceiling and/or the side walls of the vehicle compartment, and hence no visible openings may be left between the fabric sheet 1 and the surrounding compartment walls in this configuration.

In order to fully tension the cover sheet 1, the inflatable suspended ceiling 10 of the depicted embodiment comprises a compressor system 14 connected to at least one of the inflatable chamber 5 via several control valves 15 and configured to regulate pressure within the at least one inflatable chamber 5 to thereby regulate a tension level of the cover sheet 1.

The inflatable suspended ceiling 10 further comprises mounting members 6 attached to the flexible envelope 4 of the tensioning structure 3 via suspension cords 8, e.g. made of aramid (Kevlar) or nylon fibers, and configured to mount the tensioning structure 3 to counter-mounting members 7 on the structural ceiling in a hanged configuration. The counter-mounting members 7 may be connected to the structural ceiling, that is, the primary structural components of the aircraft 100, via corresponding interfaces 18 like brackets etc.

Figure 5:
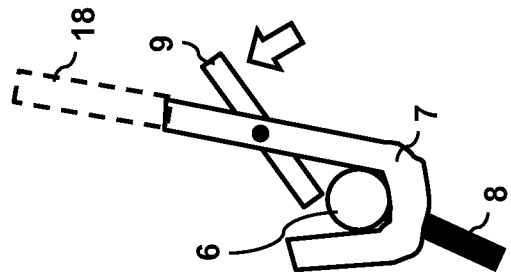
FIG. 5 shows a front view of a mounting member and a counter-mounting member for mounting the inflatable suspended ceiling of FIGS. 1-4.
Figure 6:
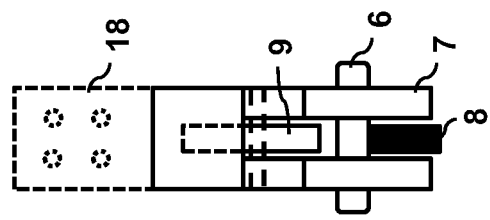
FIG. 6 shows the members of FIG. 5 in a side view.

As can be seen in FIGS. 5 and 6 in detail, each mounting member 6 is configured as a cord nipple and the respective counter-mounting member 7 is configured as a hook to take hold of the respective mounting member 6. Each counter-mounting member 7 comprises a spring forced release lever 9 configured to engage the corresponding mounting member 6 in a mounted configuration and to disengage the corresponding mounting member 6 by being pushed into a release configuration (cf. arrow in FIG. 6).

The inflatable suspended ceiling 10 according to FIGS. 1 through 6 has very low weight despite being relatively rigid, in particular if blown up to a maximum level. Moreover, the installation process is particularly simple. To this end, the ceiling 10 may be provided in a rolled-up fashion. The ceiling 10 may be continuously enrolled along the extending direction 2 and attached to the structural ceiling of the vehicle compartment via the respective mounting members 6, one after the other along the extension of the ceiling 10. At the beginning, the ceiling 10 may still be completely deflated and simply hang from the structural ceiling without any pressure. In this situation, access to the plenum space 19 between the suspended ceiling 10 and the structural ceiling may still be possible from the interior space 11, e.g. for maintenance. The deflated ceiling 10 may hang only a few cm into the cabin due to a defined length of the suspension cords 8 and the defined attachment points. The behaviour of the deflated ceiling 10 in that condition can be compare to a deflated air mattress, for example.

In a subsequent installation step, an air volume required for basically filling up the inflatable ceiling 10 can be provided by the air duct system 13. This step can be done, for example, when the aircraft 100 is put into operation (and before the passengers enter the vehicle). In this phase the main volume will inflate the ceiling 10. However, the visible part of the ceiling 10, that is, the cover sheet 1 may already be put into its end positions, where it closes of the plenum space 19 against the interior space 11 and thus roofs over the interior space 11, but where it may still not be fully tensioned.

In a third step, the cover sheet 1 may get fully tensioned by activating the compressor systems 14 and by fully pumping up the inflatable chambers 5. The control valves 15 of the air duct system 13 may be closed automatically as soon as the compressor system 14 starts to run. The compressor system 14 then can regulate the current pressure in the ceiling 10 based on appropriately placed pressure sensors. Depending on the current operation status (e.g. ground, flight etc.) and the surrounding conditions (e.g. change of pressure due to different sea-level, temperature and so on), the pressure may be adapted in a suitable manner.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the disclosure herein and its practical applications, to thereby enable others skilled in the art to best utilize the disclosure herein and various embodiments with various modifications as are suited to the particular use contemplated.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 cover sheet
2 extending direction
3 tensioning structure
4 flexible envelope
5 inflatable chamber
6 mounting member
7 counter-mounting member
8 suspension cord
9 release lever
10 Inflatable suspended ceiling
11 interior space
12 protection cover
13 air duct system
14 compressor system
15 control valve
16 riser duct interface
17 lighting element
18 compartment interface
19 plenum space
20 light ray
100 aircraft

The invention claimed is:

1. An inflatable suspended ceiling for a vehicle compartment or passenger cabin of an aircraft, the inflatable suspended ceiling comprising:
a flat fabric cover sheet configured to roof over at least a longitudinal section of an interior space along an extending direction of the vehicle compartment, underneath a structural ceiling of the vehicle compartment;
a tensioning structure attached to the cover sheet to carry the cover sheet from above and having a flexible envelope enclosing at least two inflatable chambers configured to tension the cover sheet when inflated;
wherein the at least two inflatable chambers are oriented in the extending direction, and laterally running inflatable chambers that gaseously connect the at least two inflatable chambers with each other; and
mounting members attached to the tensioning structure and configured to mount the tensioning structure to counter-mounting members on the structural ceiling in a hanged configuration.

2. The inflatable suspended ceiling according to claim 1, wherein the at least two inflatable chambers are attached, respectively, to two laterally opposite sides of the cover sheet and run along the cover sheet in the extending direction.

3. The inflatable suspended ceiling according to claim 1, comprising suspension cords connecting the mounting members with the tensioning structure and/or the counter-mounting members with the structural ceiling.

4. The inflatable suspended ceiling according to claim 3, wherein at least one of the counter-mounting members has a shape of a hook configured to hold a corresponding one of the mounting members.

5. The inflatable suspended ceiling according to claim 4, wherein the at least one of the counter-mounting members comprises a spring forced release lever configured, when in a mounted configuration, to engage and retain the corresponding one of the mounting members within the hook of the at least one of the counter-mounting members and, when in a release configuration, to disengage from and allow removal of the corresponding one of the mounting members from the hook of the at least one of the counter-mounting members.

6. The inflatable suspended ceiling according to claim 1, further comprising a protection cover covering the cover sheet and/or the tensioning structure from above.

7. The inflatable suspended ceiling according to claim 1, wherein the tensioning structure is connectable to an air duct system of the vehicle compartment to fill the at least one inflatable chamber with air.

8. The inflatable suspended ceiling according to claim 1, comprising a compressor system connected to the at least one inflatable chamber via at least one control valve and configured to regulate pressure within the at least one inflatable chamber, thereby regulating a tension level of the cover sheet.

9. The inflatable suspended ceiling according to claim 1, comprising lighting elements configured to illuminate the cover sheet from above.

10. The inflatable suspended ceiling according to claim 9, wherein the cover sheet is translucent and/or transparent at least in sections.

11. The inflatable suspended ceiling according to claim 1, wherein the cover sheet is sewed and/or welded to the tensioning structure.

12. The inflatable suspended ceiling according to claim 1, wherein the cover sheet is made from a single fabric ply.

13. An aircraft with an inflatable suspended ceiling according to claim 1.

14. The inflatable suspended ceiling according to claim 5, wherein the spring forced release lever is configured such that movement from the mounted configuration to the release configuration is performed by pushing the spring forced release lever into the release configuration.

* * * * *